(12) United States Patent
Pansegrouw (10) Patent No.: US 9,915,365 B2
(45) Date of Patent: Mar. 13, 2018

(54) INFLATION VALVE (71) Applicant: Stopak India Pvt. Ltd., Bangalore (IN)

(72) Inventor: Bester Jacobus Pansegrouw, Ottery (ZA)

(73) Assignee: Stopak India Pvt. Ltd., Bangalore (IN)

( * ) Notice: Subject to any disclaimer, the term of this patent is extended or adjusted under 35 U.S.C. 154(b) by 65 days.

(21) Appl. No.: 14/902,940

(22) PCT Filed: Apr. 15, 2014

(86) PCT No.: PCT/IB2014/060727
§ 371 (c)(1),
(2) Date: Jan. 5, 2016

(87) PCT Pub. No.: WO2015/001431
PCT Pub. Date: Jan. 8, 2015

(65) Prior Publication Data
US 2016/0186875 A1   Jun. 30, 2016

(30) Foreign Application Priority Data
Jul. 5, 2013   (ZA) .................................. 2013/05045

(51) Int. Cl.
*F16K 15/20* (2006.01)
*F01L 3/10* (2006.01)

(52) U.S. Cl.
CPC ................ *F16K 15/205* (2013.01); *F01L 3/10* (2013.01); *Y10T 137/3584* (2015.04); *Y10T 403/4651* (2015.01)

(58) Field of Classification Search
CPC ........... Y10T 137/3584; Y10T 137/374; Y10T 137/3755; Y10T 403/4651;
(Continued)

(56) References Cited

U.S. PATENT DOCUMENTS 241,930 A    5/1881   Clayton
3,411,397 A   11/1968  Birmingham
(Continued)

FOREIGN PATENT DOCUMENTS

EP    0 849 513 A2    6/1998
GB    2 038 452 A     7/1980

OTHER PUBLICATIONS

International Search Report for PCT/IB2014/060727 dated Jul. 17, 2014.
(Continued)

*Primary Examiner* — R. K. Arundale
(74) *Attorney, Agent, or Firm* — Neal, Gerber & Eisenberg LLP (57) ABSTRACT An inflation valve for inflating containers with non-rigid walls comprising a tubular body defining a passage with a first opening at one end and a second opening at its opposite end, adapted to be secured to a container; a sealing disc adapted to sealingly close off the second opening to the passage in the tubular body, and adapted to open the second opening mechanically when an inflation device is inserted into the passage through the first opening and thus gas may be passed into the container through the second opening, thereby moving the sealing disc away from the second opening; a guide member located within the passage of the tubular body; a spring adapted to assist the sealing disc to close off the second opening; and a gasket and/or sealing ring adapted to assist the sealing disc to close off the second opening.

28 Claims, 6 Drawing Sheets (58) Field of Classification Search
CPC ......... Y10T 403/4654; Y10T 403/5657; Y10T 403/4661
USPC ...................................................... 251/337
See application file for complete search history.

(56) References Cited

U.S. PATENT DOCUMENTS

| | | | | |
|---|---|---|---|---|
| 3,785,395 | A * | 1/1974 | Andreasson | F16K 15/20 137/223 |
| 3,808,981 | A * | 5/1974 | Shaw | B60P 7/065 137/224 |
| 4,015,622 | A * | 4/1977 | Pagani | B63C 9/24 137/223 |
| 4,046,163 | A | 9/1977 | Novak | |
| 4,073,389 | A * | 2/1978 | Angarola | B60P 7/065 137/223 |
| 4,146,070 | A * | 3/1979 | Angarola | B60P 7/065 137/223 |
| 4,257,575 | A * | 3/1981 | Runyan | F16K 5/061 251/292 |
| 4,766,628 | A * | 8/1988 | Walker | A47C 27/082 137/232 |
| 4,927,397 | A * | 5/1990 | Yeager | B63C 9/24 137/234 |
| 5,082,244 | A * | 1/1992 | Krier | F16L 37/40 251/149.6 |
| 5,111,838 | A * | 5/1992 | Langston | B60P 7/065 137/223 |
| 5,143,351 | A * | 9/1992 | Pierce | F01L 3/10 123/90.67 |
| 5,255,640 | A * | 10/1993 | Pierce | F01L 3/10 123/188.13 |
| 5,339,959 | A * | 8/1994 | Cornwell | B65D 33/01 206/438 |
| 5,540,528 | A * | 7/1996 | Schmidt | F16B 19/1081 24/297 |
| 5,806,572 | A * | 9/1998 | Voller | B65D 81/052 141/10 |
| 5,839,488 | A * | 11/1998 | Peters | B60P 7/065 137/223 |
| 6,089,251 | A * | 7/2000 | Pestel | B63C 9/24 137/232 |
| 7,051,753 | B1 * | 5/2006 | Caires | F16K 15/205 137/232 |
| 7,434,594 | B1 * | 10/2008 | Robbins | F16K 15/205 137/223 |
| 2006/0033067 | A1 * | 2/2006 | Wang | A47C 27/081 251/322 |
| 2008/0029166 | A1 * | 2/2008 | Song | F16K 15/063 137/542 |
| 2009/0139582 | A1 * | 6/2009 | Franta | F16K 15/202 137/232 |
| 2010/0043914 | A1 | 2/2010 | Pansegrouw | |
| 2010/0154897 | A1 * | 6/2010 | Wu | F16K 15/202 137/223 |
| 2012/0048392 | A1 | 3/2012 | Song et al. | |
| 2012/0285552 | A1 | 11/2012 | Song et al. | |
| 2014/0209185 | A1 * | 7/2014 | Wang | F16K 15/20 137/233 |
| 2015/0037113 | A1 * | 2/2015 | Maness | F16K 15/18 410/119 |

OTHER PUBLICATIONS

European Patent Office, Extended European Search Report dated Feb. 22, 2017 for corresponding European Application No. 14819730.4 (6 pages).

\* cited by examiner

INFLATION VALVE

FIELD OF INVENTION

The present invention relates to an inflation valve.

More particularly, the invention relates to inflation valves for inflating containers with non-rigid-walls, such as dunnage bags.

BACKGROUND TO INVENTION

Inflatable dunnage bags are commonly used for cushioning loads shipped in trucks, trailers and containers transported by ships, trucks or rail. This is often the case when the cargo only partially fills the container and there exists the possibility of shifting during transport that could cause damage. Typically known dunnage bags are constructed of one or more layers of paper surrounding a plastic lining. The paper protects the bags from tearing thus more layers are used in applications where the risk of damage to the dunnage bag is greater. Furthermore, for inflating and deflating the dunnage bag, a valve is attached by way of a hole cut in the bag during manufacture.

The dunnage bags are shipped flat from the manufacturer, and are inflated by packing and loading personnel as the containers are loaded with cargo. The bag is firstly placed in the space that it will occupy as cargo is loaded into a container, secondly the inflation device is attached to a valve of the dunnage bag and subsequently the dunnage bag is filled with air until an appropriate air pressure within the bag is achieved. Often this occurs within a few seconds.

Unfortunately the known type of inflation valves are difficult to operate and not flexible in operation and often do not seal correctly and thus suffer from important limitations.

It is an object of the invention to suggest an inflation device which will assist in overcoming the aforesaid problems.

SUMMARY OF INVENTION

According to the invention, an inflation valve for inflating containers with non-rigid walls, includes
  (a) a tubular body defining a passage with a first opening at one end leading into the passage and a second opening at its opposite end leading into the passage, the tubular body being adapted to be secured to a container, e.g. with non-rigid walls;
  (b) a sealing disc or plunger of plastics material, and being adapted to sealingly close off the second opening to the passage in the tubular body, and being adapted to open the second opening mechanically when an inflation device is inserted into the passage through the first opening and thus gas may be passed into the container through the second opening and thereby moving the sealing disc or plunger away from the second opening;
  (c) a guide member located within the passage of the tubular body;
  (d) a spring associated with the sealing disc or plunger and supported by the guide member, the spring being adapted to assist the sealing disc or plunger to close off the second opening; and
  (e) sealing means being adapted to assist the sealing disc or plunger to close of the second opening.

The sealing means may be a gasket and/or a sealing ring located in a cavity or recess in the sealing disc or plunger.

Also according to the invention, there is provided a method of inflating containers with non-rigid walls, which includes the steps:
  (a) of passing air and/or gas into a container with non-rigid walls through a tubular body including a passage with a first opening at one end leading into the passage and a second opening at its opposite end leading into the passage, the tubular body being adapted to be secured to the container;
  (b) of mechanically opening the second opening by means of a sealing disc or plunger of plastics material when an inflation device is inserted into the passage through the first opening and thus gas is passed into the container through the second opening and thereby moving the sealing disc or plunger away from the second opening; and
  (c) of sealingly closing off the second opening by means of the sealing disc or plunger of plastics material and a gasket or sealing ring located in a cavity or recess in the sealing disc or plunger, the sealing disc or plunger being operated by means of a spring and supported by a guide member located within the passage of the tubular body, the spring being adapted to assist the sealing disc or plunger to close off the second opening.

The tubular body may include an annular protrusion adapted to abut against the gasket or sealing ring to assist the sealing disc or plunger to close off the second opening.

The spring may have an expanded height of between about 20 to 30 millimeters (mm) and a contracted height of between about 2 to 10 mm.

The tubular body may include at least one supporting member in the passage.

The spring and the guide member and hence also the connected sealing disc or plunger may be locked in position by means of a washer and pin.

The pin may be adapted to expand the guide member of the sealing disc or plunger.

The valve may be a self-closing valve.

The valve may include a cap removably fitted over the tubular body for closing the first opening to the passage.

The method may include the step of fitting a cap over the tubular body for closing the first opening to the passage.

The invention also extends to a container with non-rigid walls provided with an inflation valve as set out herein.

The valve may include deflating means for deflating the container means.

The deflating means may include a tubular part with a cap member.

The deflating means may include at least one aperture in the tubular part and/or the cap member.

The deflating means may be adapted to open the second opening mechanically when the deflating means is inserted into the second opening and thus gas may exit out of the container through the second opening.

The deflating means may include locking means for locking the deflating means to assist in the self-deflating of the container without human assistance.

The deflating means may be connected to the tubular body by means of a connecting strip made of plastics material and a ring member adapted to be removably located around the tubular body.

The valve may include a handle for stabilising the valve whilst the container is being inflated.

The handle may be connected to the tubular body by means of a connecting strip made of plastics material.

The cap and/or the handle and/or the tubular body and/or the deflating means may be integrally formed.

The cap and the handle may be integrally formed and include a ring member adapted to be removably located around the tubular body.

The spring may be conically-shaped.

The spring may be made of metal or plastics material.

The guide member may be made of plastics material.

The sealing disc or plunger and the guide member may be integrally formed.

The valve may be used by venturi air flow guns and devices.

The air entering the container through the inflation valve may have an absolute pressure of about 9 bar.

The tubular body may be provided with a flange for securing the inflation valve to the container.

The container may be a dunnage bag, a sack and/or any other flexible container to be pressurized.

The tubular body and the cap member may include cooperating threads and/or other formations.

The tubular body may be provided with external protrusions and the deflating cap member with associated apertures or recess(es).

The inflation device may include a filling nozzle having cooperating threads, apertures and/or recesses with the tubular body.

The tubular body may be made of plastics and may be injection moulded.

The deflating means may be made of plastics and may be injection moulded.

The sealing disc or plunger and/or the gasket or sealing ring may be made of polyethylene sheet material, resilient plastics or rubber or silicon.

The valve may be a one-way or semi-one way valve.

The valve may be adapted to enable the container to be deflated to create a vacuum in the container.

BRIEF DESCRIPTION OF DRAWINGS

The invention will now be described by way of example with reference to the accompanying schematic drawing.

In the drawings there is shown in.

DETAILED DESCRIPTION OF DRAWINGS

Figure 5:
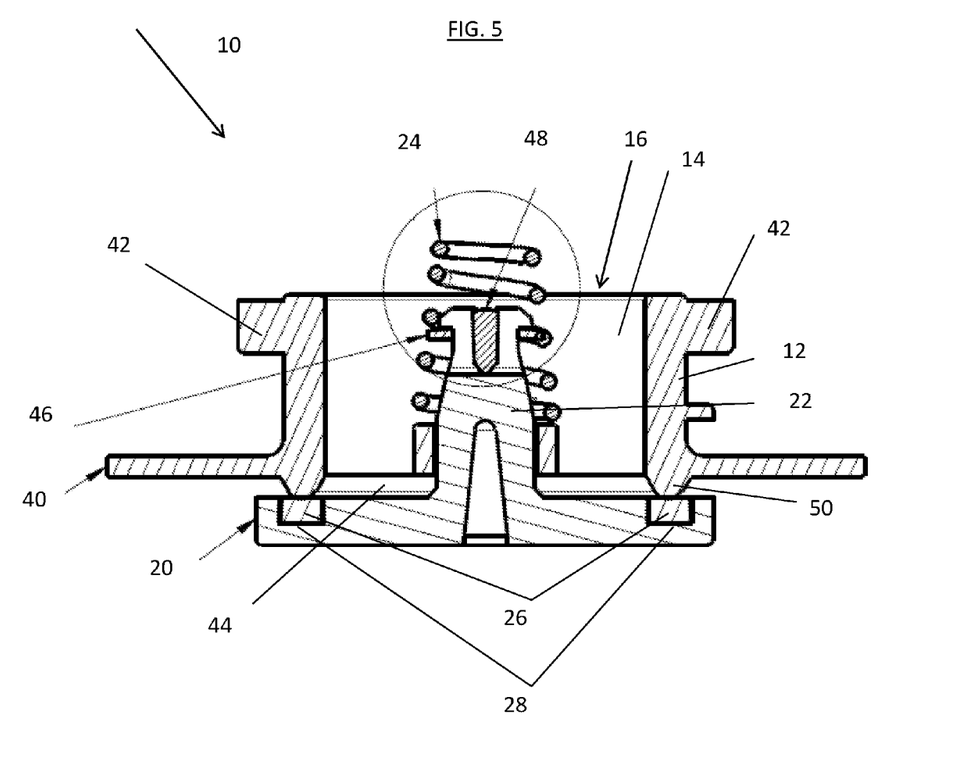
FIG. 5: a sectional side view of the inflation valve as seen along arrows V-V in FIG. 3.
Figure 6:
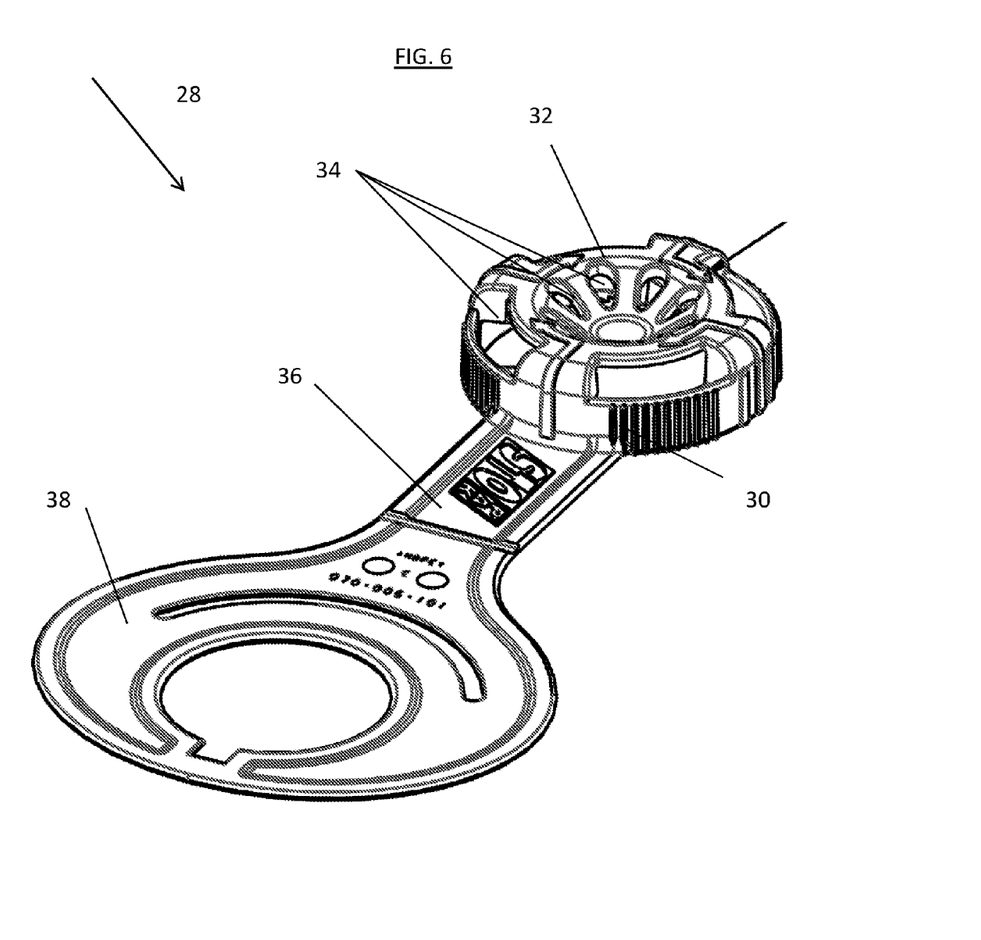
FIG. 6: a perspective view of the deflating member of the inflation valve according to the invention.

Referring to FIGS. 1 to 5. an inflation valve in accordance with the invention, generally indicated by reference numeral 10, is shown. In FIG. 6. the deflating means 28 of the inflation valve 10 in accordance with the invention is shown.

The inflation valve 10 for inflating containers with non-rigid walls, includes (a) a tubular body 12 defining a passage 14 with a first opening 16 at one end leading into the passage 14 and a second opening 18 at its opposite end leading into the passage 14, the tubular body 12 being adapted to be secured to a container, e.g. with non-rigid walls;

(b) a sealing disc or plunger 20 of plastics material, and being adapted to sealingly close off the second opening 18 to the passage 14 in the tubular body 12, and being adapted to open the second opening 18 mechanically when an inflation device is inserted into the passage 14 through the first opening 16 and thus gas may be passed into the container through the second opening 18 and thereby moving the sealing disc or plunger 20 away from the second opening 18;

(c) a guide member 22 located within the passage 14 of the tubular body 12;

(d) a coil-spring 24 associated with the sealing disc or plunger 20 and supported by the guide member 22, the spring 24 being adapted to assist the sealing disc or plunger 20 to close off the second opening 18; and (e) a gasket or sealing ring 26 located in a cavity or recess 28 in the sealing disc or plunger 20 and being adapted to assist the sealing disc or plunger 20 to close off the second opening 18.

The tubular body 12 includes an annular protrusion 50 adapted to abut against the gasket or sealing ring 26 to assist the sealing disc or plunger 20 to close of the second opening 18.

The spring 24 has an expanded height of between about 20 to 30 millimeters (mm) and a contracted height of between about 2 to 10 mm.

The tubular body 12 includes three supporting members 44 in the passage 14.

The spring 24 and the guide member 22 and hence also the connected sealing disc or plunger 20 are locked in position by means of a washer 46 and pin 48.

The pin 48 is adapted to expand the guide member 22 of the sealing disc or plunger 20.

The valve 10 is a self-closing valve.

The valve 10 can include a cap removably fitted over the tubular body 12 for closing the first opening 16 to the passage 14.

The valve 10 includes deflating means 28 for deflating the container means.

The deflating means 28 includes a tubular part 30 with a cap member 32.

The deflating means 28 includes aperture 34 in the tubular part 30 and the cap member 32.

The deflating means 28 is adapted to open the second opening 18 mechanically when the deflating means 28 is inserted into the second opening 18 and thus gas may exit out of the container through the second opening 18.

The deflating means 28 includes locking means for locking the deflating means 28 to assist in the self-deflating of the container without human assistance.

The deflating means 28 is connected to the tubular body 12 by means of a connecting strip 36 made of plastics material and a ring member 38 adapted to be removably located around the tubular body 12.

The valve 10 includes a handle (not shown) for stabilising the valve 10 whilst the container is being inflated. The handle can be connected to the tubular body 12 by means of the connecting strip 36 made of plastics material. The cap and the handle can integrally formed and include a ring member adapted to be removably located around the tubular body 12.

The cap and/or the handle and/or the tubular body and/or the deflating means 28 can be integrally formed.

The spring 24 is be conically-shaped and is made of metal or plastics material.

The guide member 22 is made of plastics material.

The sealing disc or plunger 20 and the guide member 22 are integrally formed.

The valve 10 is used by venturi air flow guns and devices.

The air entering the container through the inflation valve 10 has an absolute pressure of about 9 bar.

The tubular body 12 is provided with a flange 40 for securing the inflation valve 10 to the container.

The container is a dunnage bag, a sack and/or any other flexible container to be pressurized.

The tubular body 12 and the cap member 32 include cooperating threads and/or other formations.

Figure 1:
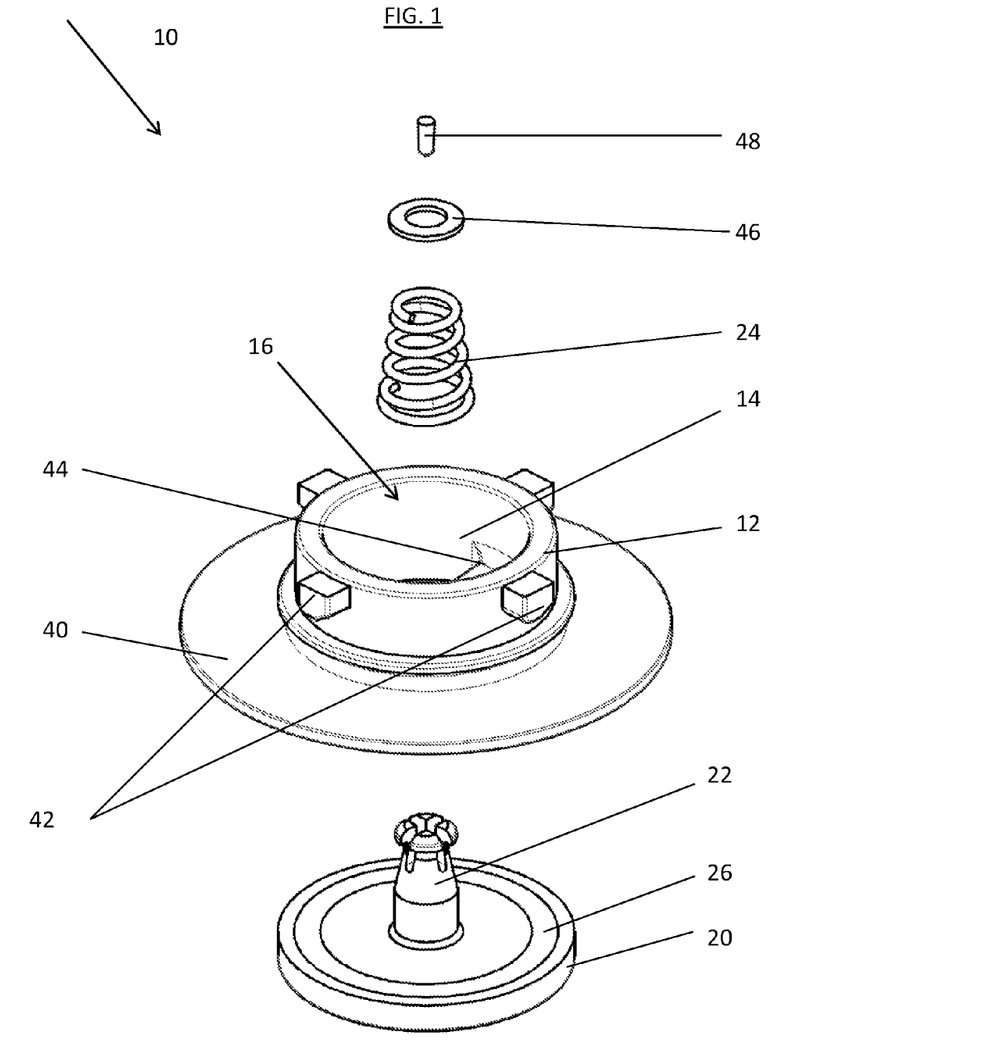
FIG. 1: an exploded perspective view of the inflation valve according to the invention showing the individual components.
Figure 2:
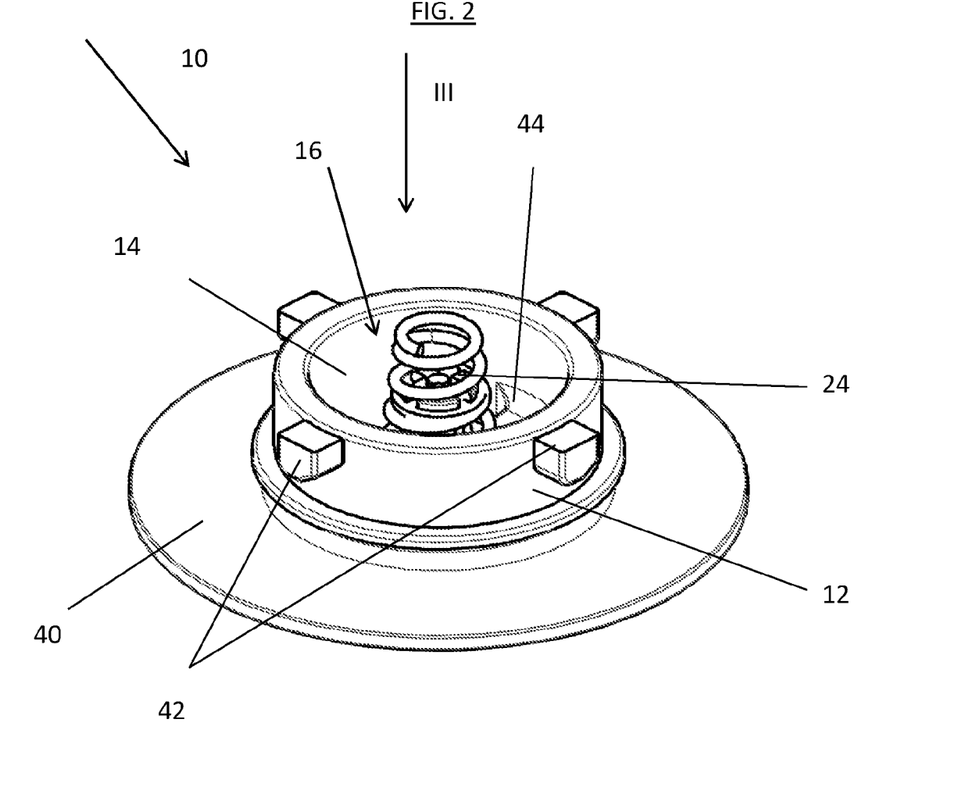
FIG. 2: a perspective view of the assembled inflation valve shown in FIG. 1.
Figure 3:
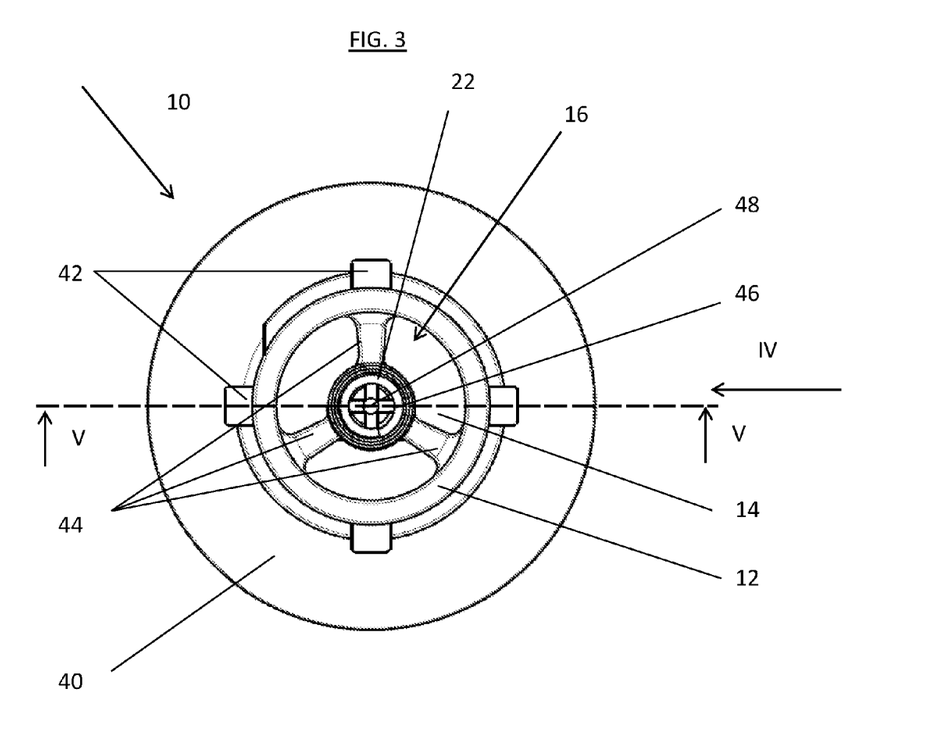
FIG. 3: a top view of the inflation valve as seen from arrow III in FIG. 2.
Figure 4:
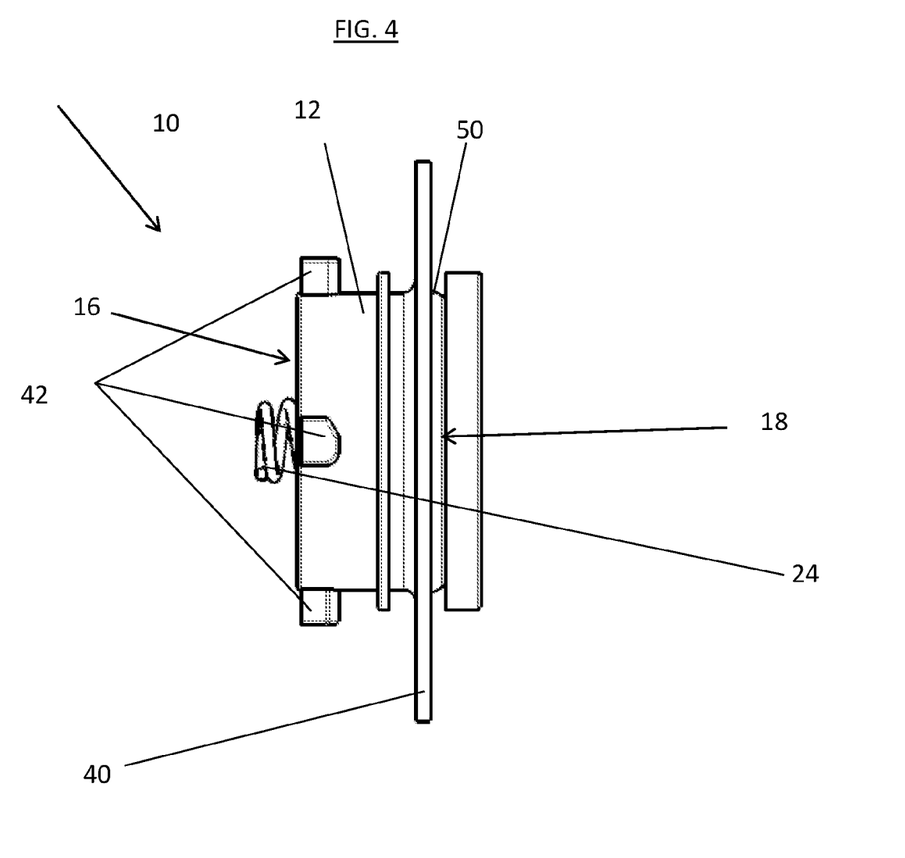
FIG. 4: a side view of the inflation valve as seen from arrow IV in FIG. 3.

The tubular body 12 is provided with external protrusions 42 and the deflating cap member 34 with associated apertures or recess(es).

The inflation device 10 includes a filling nozzle having cooperating threads, apertures and/or recesses with the tubular body 12.

The tubular body 12 is made of plastics and may be injection moulded.

The deflating means 28 is made of plastics and may be injection moulded.

The sealing disc or plunger 20 and/or the gasket or sealing ring 26 can be made of polyethylene sheet material, resilient plastics or rubber or silicon.

The valve 10 is a one-way or semi-one way valve.

The valve 10 can be adapted to enable the container to be deflated to create a vacuum in the container.

Hence the invention provides a method of inflating containers with non-rigid walls, which includes the steps:

(a) of passing air and/or gas into a container with non-rigid walls through a tubular body 12 including a passage 14 with a first opening 16 at one end leading into the passage 14 and a second opening 18 at its opposite end leading into the passage 14, the tubular body 12 being adapted to be secured to the container;

(b) of mechanically opening the second opening 18 by means of a sealing disc or plunger 20 of plastics material when an inflation device is inserted into the passage 14 though the first opening 16 and thus gas may be passed into the container through the second opening 18 and thereby moving the sealing disc or plunger 20 away from the second opening 18; and (c) of sealingly closing off the second opening 18 by means of the sealing disc or plunger 20 of plastics material and a gasket or sealing ring 26 located in a cavity or recess 28 in the sealing disc or plunger 20, the sealing disc or plunger 20 being operated by means of a spring 24 and supported by a guide member 22 located within the passage 14 of the tubular body 12, the spring 24 being adapted to assist the sealing disc or plunger 20 to close off the second opening 18.

The method may include the step of fitting a cap over the tubular body 12 for closing the first opening 16 to the passage 14.

The method includes the step of deflating the container after the fitting step by a means of deflating the container associated with a valve 10.

In use the inflation valve 10 is secured to a container, such as a dunnage bag, a sack or other containers with non-rigid walls.

When filling the container, a gas filling nozzle of an inflation device is connected by means of an adapter to the inflation valve 10. The gas passed into the container pushes the sealing disc or plunger 20 away from the tubular body 12 and thus the gas can enter the container through the second opening 18. Thereby, the inflation valve 10 is opened and allows inflation of the container. When removing the gas filling nozzle, the sealing disc or plunger 20 together with the gasket or sealing ring 26 moves to its original position as a result of the action of the spring 26 and sealingly fits over the second opening 18. The pressure of gas inside the container facilitates the sealing of the second opening 18 by means of the sealing disc or plunger 20.

Furthermore, in order to ensure that the gas filling nozzle is locked once inserted in the first opening 16, the gas filling nozzle is provided with an internal thread or formation which cooperates with an external thread or protrusion of the tubular body 12.

The invention claimed is:

1. An inflation valve comprising:
    (a) a tubular body defining a passage with a first opening at one end leading into the passage and a second opening at its opposite end leading into the passage, the tubular body configured to be secured to a container having non-rigid walls;
    (b) a plastic plunger configured to sealingly close off the second opening to the passage in the tubular body, and the plunger configured to open the second opening mechanically when an inflation device is inserted into the passage through the first opening to facilitate gas flowing into the container through the second opening and thereby moving the plunger away from the second opening;
    (c) a guide member located within the passage of the tubular body;
    (d) a spring associated with the plunger and supported by the guide member, the spring configured to assist the plunger to close off the second opening;
    (e) a gasket located in a cavity of the plunger and the gasket configured to assist the plunger to close off the second opening, and
    (f) a pin configured to expand the guide member of the plunger.

2. The valve of claim 1, wherein the tubular body includes an annular protrusion configured to abut against the gasket to assist the plunger to close off the second opening.

3. The valve of claim 1, wherein the spring has an expanded height of between about 20 and 30 millimeters and a contracted height of between about 2 and 10 millimeters.

4. The valve of claim 1, wherein the tubular body includes at least one supporting member in the passage.

5. The valve of claim 1, further including a washer associated with the pin, wherein the washer and the pin are configured to lock the spring, the guide member and the plunger in a position.

6. The valve of claim 1, wherein the valve is a self-closing valve.

7. The valve of claim 1, further including a cap removably fitted over the tubular body to close the first opening of the passage.

8. The valve of claim 1, further including a deflating means for deflating the container.

9. The valve of claim 8, wherein the deflating means includes a tubular part with a cap member.

10. The valve of claim 9, wherein at least one of the tubular part or the cap member includes an aperture.

11. The valve of claim 8, wherein the deflating means is configured to open the second opening mechanically when the deflating means is inserted into the second opening and the deflating means facilitating gas flowing out of the container through the second opening.

12. The valve of claim 8, wherein the deflating means includes a locking means for locking the deflating means in pace to assist in self-deflating of the container without human assistance.

13. The valve of claim 8, wherein the deflating means is connected to the tubular body via a plastic connecting strip and a ring member configured to be removably located around the tubular body.

14. The valve of claim 1, wherein the spring is conically-shaped.

15. The valve of claim 1, wherein the spring is made of at least one of a metal material or a plastics material.

16. The valve of claim 1, wherein the guide member is plastic.

17. The valve of claim 1, wherein the plunger and the guide member are integrally formed.

18. The valve of claim 1, wherein the valve is used by venturi air flow guns and devices.

19. The valve of claim 1, wherein air entering the container through the inflation valve has an absolute pressure of about 9 bar.

20. The valve of claim 1, wherein the tubular body is provided with a flange to secure the inflation valve to the container.

21. The valve of claim 1, wherein the container is at least one of a dunnage bag, a sack or a flexible container to be pressurized.

22. The valve of claim 9, wherein (1) the tubular body is provided with an external protrusion and (2) the cap member is provided with a corresponding recess to receive the external protrusion.

23. The valve of claim 22, wherein the inflation device includes a filling nozzle having a recess corresponding with the external protrusion of the tubular body.

24. The valve of claim 1, wherein the tubular body is plastic and the tubular body is injection moulded.

25. The valve of claim 8, wherein the deflating means is plastic and the deflating means is injection moulded.

26. The valve of claim 1, wherein the gasket is made of at least one of a polyethylene sheet material, rubber or silicon.

27. The valve of claim 1, wherein the valve is a one-way valve or a semi-one way valve.

28. The valve of claim 1, wherein the valve is configured to enable the container to be deflated to create a vacuum in the container.

* * * * *